United States Patent [19]

Althaus et al.

[11] Patent Number: 5,127,075
[45] Date of Patent: Jun. 30, 1992

[54] TRANSMISSION AND RECEPTION MODULE FOR BI-DIRECTIONAL OPTICAL MESSAGE AND SIGNAL TRANSMISSION

[75] Inventors: Hans-Ludwig Althaus, Lappersdorf; Alfred Hartl, Pettendorf/Kneiting; Werner Spaeth, Holzkirchen, all of Fed. Rep. of Germany

[73] Assignee: Siemens Aktiengesellschaft, Munich, Fed. Rep. of Germany

[21] Appl. No.: 721,399

[22] Filed: Jun. 26, 1991

[30] Foreign Application Priority Data

Jun. 27, 1990 [EP] European Pat. Off. ........ 90112266.3

[51] Int. Cl.$^5$ .............................................. G02B 6/42
[52] U.S. Cl. ........................................ 385/94; 385/92; 385/93; 385/47; 357/17; 357/74; 250/227.14
[58] Field of Search ............... 350/96.2, 96.18, 96.17, 350/96.16, 96.15; 250/227.14, 227.15, 227.17, 227.24; 357/17, 19, 30, 74, 80; 385/47, 88, 89, 90, 91, 92, 93, 94

[56] References Cited

U.S. PATENT DOCUMENTS 4,423,922  1/1984  Porter .............................. 350/96.15
4,767,171  8/1988  Keil et al. ........................ 350/96.18

FOREIGN PATENT DOCUMENTS 0238977  9/1987  European Pat. Off. .
2162336  1/1986  United Kingdom .

Primary Examiner—John D. Lee
Assistant Examiner—Phan T. Heartney
Attorney, Agent, or Firm—Hill, Van Santen, Steadman & Simpson

[57] ABSTRACT

Within a common housing are mounted an autonomous light transmitter having its own transmitter optical coupling element, an autonomous light receiver, a part for connecting a common optical fiber to the common housing, and a beam splitter arranged in the beam path within the common housing. The autonomous light transmitter and the autonomous light receiver are each within their own hermetically sealed encapsulations and it is these hermetically sealed autonomous components which are mounted within the common housing.

13 Claims, 1 Drawing Sheet

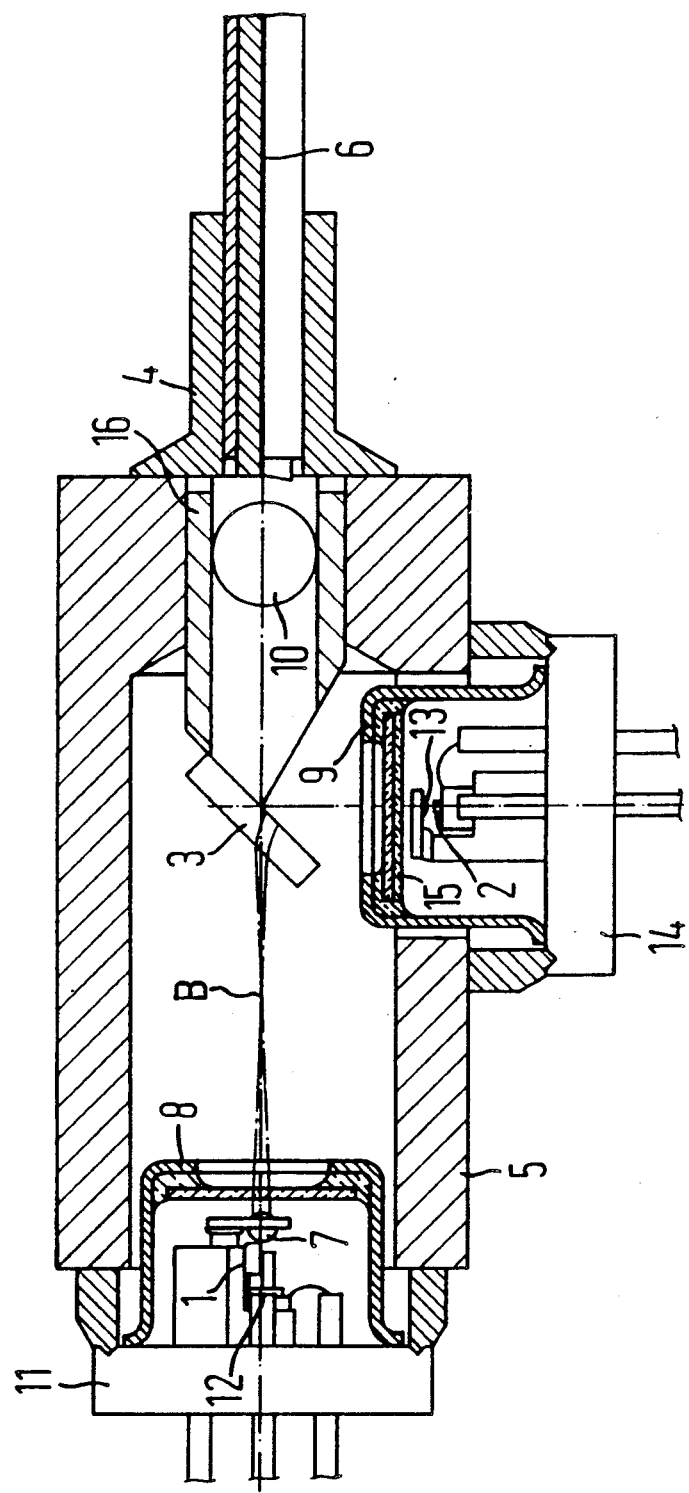

TRANSMISSION AND RECEPTION MODULE FOR BI-DIRECTIONAL OPTICAL MESSAGE AND SIGNAL TRANSMISSION

BACKGROUND OF THE INVENTION

1. Field of the Invention

The present invention relates generally to a module for receiving and transmitting optical signals and, in particular, to a module including a light transmitter, a light receiver, a beam splitter, and a connector for coupling the module to an optical fiber.

2. Description of the Related Art

A transmission and reception module, which is for use in a bi-directional optical communications network, is disclosed in European Published application 0 238 977. The transmission and reception module includes two spherical lenses which are essentially arranged at a distance from one another between a laser diode and the end of a light guide fiber, so that the spherical lenses focus the laser light onto the end of the fiber. A light ray separating means or beam splitter is arranged between the spherical lenses. Some of the light is divergently emitted from the end of the fiber in the direction of the lens farthest from the laser diode (i.e. the lens closest to the fiber) and is focused by this lens and has a wavelength different than the wavelength of the light emitted from the laser. It is this light which the beam splitter separates from the beam path and directs toward a detector or light receiver. To avoid sensitivity to deadjustment in the module, the laser diode and the lens which is closest thereto are fixed in position relative to one another on a common carrier member and are thus protected from deadjustment. At least the laser diode or the laser transmitter, the lens closest to the transmitter, the beam splitter, and the detector are mounted in a housing which may be connected to one end of an optical fiber so that the fiber end is arranged in the focus of the light of one wavelength which is stationarily defined relative to the common housing. The common housing, however, must be hermetically sealed for protection against disturbing environmental influences, particularly those which would effect the operation of the active semiconductor components (such as the light transmitter and the light receiver) mounted within the housing.

SUMMARY OF THE INVENTION

An object of the present invention is to provide a transmission and reception module which is simplified in structure so that the manufacturing outlay and, thus, the manufacturing costs are considerably reduced without neglecting the protection of the active semiconductor components.

This and other objects and advantages of the invention are achieved in a transmission and reception module which has an autonomous light transmitter mounted in a common housing with an autonomous light receiver and with a beam splitter wherein each of the autonomous components is surrounded by a hermetically sealed encapsulation. The autonomous components are each self-contained and capable of being used separately from the common housing.

Advantageous developments and improvements in the invention include providing the autonomous light receiver with optical coupling elements within the encapsulation surrounding the autonomous light receiver. Further, optical coupling for an optical fiber which may be connected to the common housing are preferably mounted within the common housing. The optical coupling elements for the optical fiber may include a convex lens which is attached to a carrier part on which the beam splitter is mounted within the common housing. Means for connecting the optical fiber to the common housing may either permanently or removeably affix the fiber to the housing. The connector part for mounting the optical fiber to the common housing may be a plug jack.

It is contemplated that the beam splitter may either be a proportional beam splitter which divides a light beam of defined wavelength in a given ratio, or may instead be a wavelength selective beam splitter. The optical coupling elements for the autonomous light transmitter may either be arranged inside the encapsulation, outside the encapsulation for the autonomous component, or may even form a part of the encapsulation thereof.

The advantages achieved with the present invention are particularly available where the overall module is formed of sub-assemblies. The sub-assemblies are autonomous components on their own which may be tested or even used outside the overall module and which are each hermetically sealed components. The autonomous electro-optical transmission and reception components and the beam splitter are mounted in the common housing so that they simultaneously or successively receive or transmit optical signals from or to an optical fiber which is either permanently or detachably connected to the common housing.

The bi-directional module may be particularly advantageously used as an electro-optical transmission and reception means for optical signals or messages or data transmission via light conducting optical fibers such as light waveguides of plastic or glass or what are referred to as multi-mode or mono-mode fibers of silica for optical communications technology.

A critical advantage of the module according to the present invention is that the active semiconductor components, including the light transmitter and the light receiver, are encapsulated in a hermetically tight seal. As a result, it is no longer necessary to hermetically seal the overall module as required in the known arrangements since the formation of such overall seal is considerably more involved technically, particularly for fastening of an optical fiber. By contrast, an inexpensive possibility for fastening a fiber is available in the present device including either hermetically tight fasteners as well as non-sealing optical fiber connecting methods such as welding, soldering, or gluing. The possibility is thus available of detachably connecting the light guide fibers using an open plug jack as the connector for the fiber.

The adjustment of the various sub-assemblies, including the transmitter and receiver components, may be performed in different sequences. For example, it is possible that the beam splitter and the lens be provided on or in the fiber connector portion which has been integrally formed in the common housing before the remaining elements are inserted. The adjustment and fixing sequence for the light transmitter, the light receiver and the optical fiber modules for optimum light in-feed and out-feed can ensue successively or iteratively in common. The fixing of the assemblies in the common housing, for example, may occur by laser welding.

BRIEF DESCRIPTION OF THE DRAWINGS

The invention shall be set forth in greater detail below with reference to an exemplary embodiment shown in the Figure wherein:

The Figure is a schematic cross section of a transmission and reception module for optical communications in accordance with the principles of the present invention.

DETAILED DESCRIPTION OF THE PREFERRED EMBODIMENTS

In the Figure is shown a bi-directional transmission and reception module which is essentially composed of a light transmitter 1 with its optical coupling elements, a light receiver 2, a connector part 4 for a common optical fiber 6, and a beam splitter 3 which is arranged intermediately in the beam path B thereof. These elements are surrounded by a common housing 5 to which the optical fiber 6 is connected, a beam path B of the light beam being through the hollow interior of the common housing 5, as can be seen in the Figure. The light transmitter 1, which is referred to as a TO transmitter unit, is composed of, for example, a base plate 11 having a laser diode 1' attached thereon and of a monitor diode 12 at the backside of the laser diode 1' and is further composed of a lens 7 for focusing the laser beam as its optical coupling element.

The environmentally sensitive monitor laser lens is hermetically sealed with an encapsulation preferably in the form of a planer window cap 8. The encapsulation 8, thus, includes a cap mounted on the base plate 11, which is provided with a planar light transmissive window 8'. The coupling element 7 for the light transmitter 1 that, in the preferred embodiment, is in the form of a lens within the encapsulation 8 can be arranged instead outside of the encapsulation 8. It is also an expedient improvement when the optical coupling element 7 forms part of the encapsulation 8, in other words, the lens replaces the window 8'. The planar window of the cap 8 in such a case, for example, is thus either plano-concave or bi-concave. It is also contemplated that the transmitter unit 1 may have only a light emitting diode (LED) instead of the laser diode 1' and the monitor diode 12. In any case, the transmitter unit 1 itself represents an autonomous component.

The light receiver 2 or detector arrangement which is referred to as a TO reception unit, is attached to a base plate 14 and is hermetically sealed within an encapsulation or housing which preferably includes a planar window cap 9 having a window 9'. The planar window 9' in the cap 9 is formed as a blocking filter for blocking a defined light wavelength λ. Instead, it may be transmissive for this wavelength λ and have an additional blocking filter 15 which can be fixed inside or outside of the planar window 9' in the cap 9. In certain instances, the blocking filter 15 may be entirely omitted. Finally, the planar window 9' in the cap 9 may be formed as a lens so that the optical coupling element forms part of the encapsulation. The detector arrangement or light receiver 2 can expediently be provided with an internal lens 13 as an optical coupling element. However, the detector arrangement may be constructed without such a lens and may only be a photo diode in some embodiments.

An alternative for the detector arrangement is a photo diode with an amplifier unit or an amplifier with an integrated photo diode. However, a further electrical and/or electro-optical passive components may be contained within the detector arrangement. In any case, the light receiving unit 2 is on an autonomous, hermetically sealed component.

The beam splitter 3 forms an optical separating means for either separating different wavelengths or for proportionally splitting one wavelength. For different wavelengths in the transmitter and receiver branch, the beam splitter is a wavelength selective beam splitter, with which a separation of more than 95% may be achieved using known technology. For a given wavelength, for example, a proportional splitter may split the wavelength in the two directions in a either a 50% separation or some other separation ratio.

The in-feed and out-feed of the light from the common optical fiber 6 requires that a lens 10 be provided as an optical coupling element in a preferred exemplary embodiment as shown in the Figure. The exemplary lens 10 is a spherical lens and is attached to a carrier part 6 on which the beam splitter 3 is mounted within the common housing 5. Given a corresponding design of the overall coupling optics, however, the lens 10 may be omitted.

It is possible that the common optical fiber may be permanently connected to the module housing 5, or may instead be detachably mounted such as by a plug jack. The fixing of the assembly including the transmitter and receiver units within the common housing 5 may be undertaken, for example, by laser welding.

Thus, there is shown and described a transmission and reception module for bi-directional message and signal transmission which includes a light transmitter having its optical coupling element, a light receiver, a connector part for coupling a common optical fiber to a common housing, and a beam splitter which is intermediately arranged in the beam path and is mounted within the common housing. The light transmitter and the light receiver are each autonomous components which are each hermetically sealed in their own encapsulation and it is these autonomous components within their own encapsulation which are introduced into the common housing with the beam splitter. The bi-directional transmission and reception module of the present invention is particularly useful in optical communications technology.

Although other modifications and changes may be suggested by those skilled in the art, it is the intention of the inventors to embody within the patent warranted hereon all changes and modifications as reasonably and properly come within the scope of their contribution to the art.

We claim:

1. A transmission and reception module for bi-directional message transmission, comprising:

a hollow common housing enclosing a beam path within said hollow common housing;

an autonomous light transmitter component mounted in said common housing to transmit light along said beam path within said common hollow housing;

a first hermetically tight encapsulation surrounding said autonomous light transmitter component;

a transmitter optical coupling element mounted in said common housing in said beam path of light emitted from said autonomous light transmitter component;

an autonomous light receiver component mounted in said common housing to receive light transmitted along said beam path in air within said common hollow housing;

a second hermetically tight encapsulation surrounding said light receiver component;

an optical fiber connector mounted on said common housing by which a common optical fiber may be connected to said housing in said beam path; and a beam splitter mounted in said common housing and arranged intermediately in said beam path for light entering or leaving said optical fiber;

said common hollow housing surrounding said autonomous light transmitter component and said transmitter optical coupling element and said beam splitter.

2. A transmission and reception module as claimed in claim 1, further comprising:

a receiver optical coupling element mounted in said beam path of light entering said light receiver component, said receiver optical coupling element being contained within said second encapsulation.

3. A transmission and reception module as claimed in claim 1, further comprising:

a fiber optical coupling element mounted in said common housing in said beam path of the optical fiber.

4. A transmission and reception module as claimed in claim 3, wherein said beam splitter includes a carrier part mounted in said common housing; and wherein said fiber optical coupling element comprises a convex lens connected to the carrier part.

5. A transmission and reception module as claimed in claim 1, wherein said optical fiber connector comprises means for permanently affixing said optical fiber to said common housing.

6. A transmission and reception module as claimed in claim 1, wherein said optical fiber connector comprises means for detachably affixing said optical fiber to said common housing.

7. A transmission and reception module as claimed in claim 1, wherein said optical fiber connector is a plug jack.

8. A transmission and reception module as claimed in claim 1, wherein said beam splitter is a proportional beam splitter.

9. A transmission and reception module as claimed in claim 1, wherein said beam splitter is a frequency-selective beam splitter.

10. A transmission and reception module as claimed in claim 1, wherein said transmission optical coupling element is mounted within said first hermetically tight encapsulation.

11. A transmission and reception module as claimed in claim 1, wherein said transmitter optical coupling element is mounted outside said first hermetically tight encapsulation.

12. A transmission and reception module as claimed in claim 1, wherein said transmitter optical coupling element forms part of said first hermetically tight encapsulation.

13. A transmission and reception module as claimed in claim 1, wherein said common hollow housing is of metal.

* * * * *